(12) United States Patent
Inoue et al.

(10) Patent No.: US 7,098,953 B2
(45) Date of Patent: Aug. 29, 2006

(54) IMAGING APPARATUS INCLUDING A PLURALITY OF PHOTOELECTRIC TRANSFER DEVICES

(75) Inventors: Mitsuo Inoue, Tokyo (JP); Tomohiro Sasagawa, Tokyo (JP); Hiroaki Sugiura, Tokyo (JP); Masao Hamamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 712 days.

(21) Appl. No.: 09/756,191

(22) Filed: Jan. 9, 2001

(65) Prior Publication Data

US 2002/0089698 A1    Jul. 11, 2002

(51) Int. Cl.
G02B 13/16    (2006.01)
H04N 5/225    (2006.01)

(52) U.S. Cl. ................ 348/335; 348/222.1; 348/218.1; 348/294

(58) Field of Classification Search ................ 348/335, 348/350, 217.1, 45, 48, 49, 50, 42, 46, 47, 348/218, 294, 222.1
See application file for complete search history.

(56) References Cited

U.S. PATENT DOCUMENTS

| 3,876,829 | A |   | 4/1975 | Schreiber |  |
|---|---|---|---|---|---|
| 4,506,951 | A | * | 3/1985 | Yamada | 359/820 |
| 5,237,340 | A | * | 8/1993 | Nelson | 347/138 |
| 5,682,198 | A | * | 10/1997 | Katayama et al. | 348/47 |
| 5,727,239 | A | * | 3/1998 | Hankawa et al. | 348/49 |
| 5,738,427 | A | * | 4/1998 | Booth et al. | 353/57 |
| 5,835,133 | A | * | 11/1998 | Moreton et al. | 348/49 |
| 5,880,777 | A |   | 3/1999 | Savoye et al. |  |
| 5,940,126 | A | * | 8/1999 | Kimura | 348/294 |
| 6,476,850 | B1 | * | 11/2002 | Erbey | 348/51 |
| 6,632,172 | B1 | * | 10/2003 | Igarashi | 600/166 |
| 6,686,956 | B1 | * | 2/2004 | Prakash et al. | 348/218.1 |
| 6,750,904 | B1 | * | 6/2004 | Lambert | 348/218.1 |

FOREIGN PATENT DOCUMENTS

| JP | 10-227962 | 8/1998 |
|---|---|---|
| JP | 10-293236 | 11/1998 |

* cited by examiner

*Primary Examiner*—Tuan Ho
*Assistant Examiner*—Gevell Selby
(74) *Attorney, Agent, or Firm*—Oblon, Spivak, McClelland, Maier & Neustadt, P.C.

(57) ABSTRACT

An imaging apparatus including at least an imaging device having a plurality of photoelectric transfer devices arranged in matrix-shape to detect a light irradiated to each photoelectric transfer device and transfer to electric signal, and imaging means for imaging an image of a photogenic object on a surface of the imaging devices. The imaging means images at least two similar images of the photogenic subject on different area of the surface of the imaging device, and the imaging apparatus further includes electric signal processing means to form one image of photogenic subject from at least two images of photogenic subject. Since a plurality of images of photogenic subject can be formed on the imaging device by a plurality of image formation lenses, a thinner imaging apparatus can be realized.

2 Claims, 14 Drawing Sheets

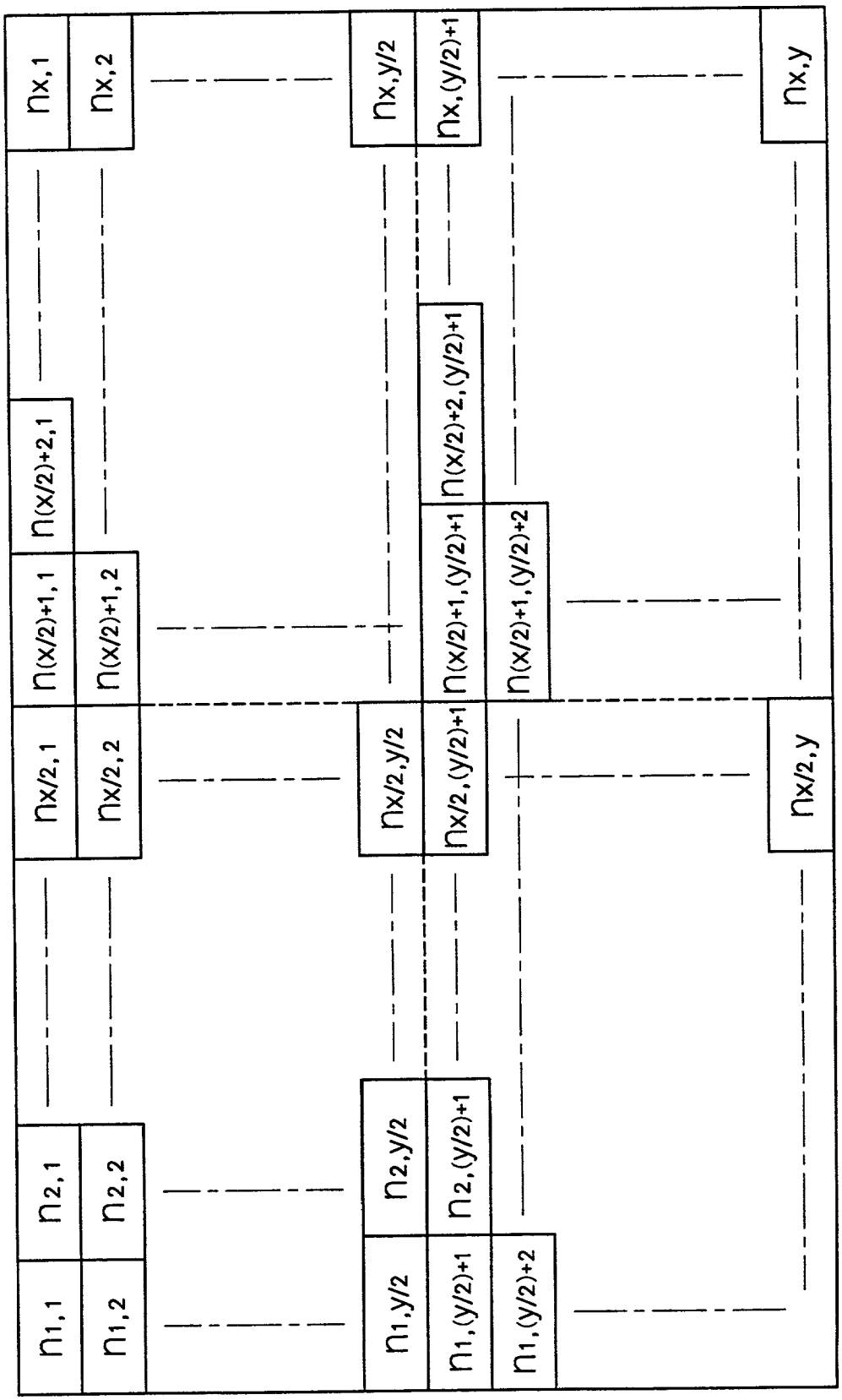

IMAGING APPARATUS INCLUDING A PLURALITY OF PHOTOELECTRIC TRANSFER DEVICES

BACKGROUND OF THE INVENTION

The present invention relates to an imaging apparatus for still picture or moving pictures to photograph photogenic subjects.

Imaging apparatuses using, as imaging devices, solid imaging devices such as CCD, CMOS and artificial retina chips have been used for still cameras or video cameras. Recently, in addition to the single device which has made photography a main purpose, an imaging apparatus capable of being installed in and connected to personal computers, portable information terminals or mobile phones is designed. When the characteristics of these information devices are considered, miniaturization of imaging apparatuses is a very important factor.

FIG. 14 shows a constitutional view of a conventional solid imaging system disclosed in e.g. Japanese Unexamined Patent Publication No. 227962/1998 and No. 293236/1998. In FIG. 14, 101 shows a photogenic subject, 102 an image formation lens to image the photogenic subject on the surface of an imaging device, 103 an imaging device having matrix-shaped photoelectric transfer devices to transfer to electric signals corresponding to optical intensity formed by an image 105 of photogenic subject imaged by image formation lens, and 104 a lens-barrel carrying the lens. Hereinbelow, filters such as low-pass filters and infrared filter are omitted in FIG. 14 for simplification.

Next, the operation is explained. A ray of light reflected by the photogenic subject 101 or generated by the photogenic subject 101 images the image 105 of the photogenic subject on the imaging device 103 by the image formation lens 102. Many photoelectric transfer devices are arranged on the imaging device 103, one photoelectric transfer device detects the optical intensity reaching a certain space and transfers light to electric signal corresponding to the optical intensity, and it is possible to reproduce the image of photogenic subject 105 imaged on whole of the imaging device on a display or the like by these electric signals and positional informations of arrangement of photoelectric transfer devices.

The brightness and the angle of field show the characteristics of optical system for imaging apparatuses. The brightness indicates a standard of brightness of the photogenic subject which can be photographed when the diaphragm is opened, and ordinarily F number indicates the brightness. When "a" shows the effective diameter of lens and "f" indicates the focal length of lens, the formula "F number=f/a" is given. Moreover, the angle of field indicates the field of the photogenic subject which can be photographed by the imaging system, that is, the field which the imaging device can stare through lens. For example, when the surface of the imaging device has the opposite angle b=½ inch (12.7 mm) and the shape is same as an ordinary television display having the hight and width in the ratio of three to four, the hight of the imaging device is (⅗)×b, and the width is (⅘)×b. When "L" (in the case of infinite focus, equal to approximately f) shows the distance from lens to the imaging device, the angle of field is given by the following formulas $$\text{The vertical angle of field} = 2 \times \tan^{-1}(((3/5) \times b/2)/L) \quad (1)$$

$$\text{The horizontal angle of field} = 2 \times \tan^{-1}(((4/5) \times b/2)/L) \quad (2)$$

Hereinbelow, assuming that a standard image formation lens for the imaging apparatus has F number of 2.8, and horizontal angle of field of 40°, the above formulas lead to f=13.96 mm, and a=4.98 mm. Therefore, the distance from the lens to the imaging device, that is, the thickness of the imaging apparatus is about 14 mm. On the other hand, the resolution of an image of the photogenic subject is determined by pixel pitches arranged in matrix-shape on the imaging device, and in the case of the imaging device having the opposite angle b=½ inch, to obtain an image having a width of 10.16 mm and VGA (640×480 pixels: the surface size of the imaging device shown in FIG. 13), the pixel pitch should be about 15.9 µm.

Now, FIG. 14 shows the resolution of a conventional imaging apparatus. In FIG. 14, X shows a position of the image formation lens, and Y an axis of the image formation lens. An arrow indicates the image and its size is 200 pixels. To explain simply, assuming that only the horizontal resolution is taken notice of and there is the photogenic subject having a width of 159 mm at a position of 698 mm from the lens, the distance L from the lens to the imaging device is 13.96 mm, so that the image of the photogenic subject will be reduced to 1/50 (13.96÷698) and be imaged on the imaging device. Accordingly, the size of the image of photogenic subject is 3.18 mm, and with respect to resolution, the image is read by the imaging device having 15.9 µm pitches, so that the image will be read by 200 pixels in the horizontal direction.

Since the conventional imaging apparatus has the above arrangement, the distance from the image formation lens to the light-receiving surface of imaging device must be long to gain a standard brightness and an angle of field, which makes imaging apparatuses thicker. Moreover, when the conventional imaging apparatus is installed to electronic machines, especially mobile phone machines, portable cameras, watches and portable information terminals, the size of these portable electronic machines becomes large because of a thick imaging system, and when connecting the conventional imaging apparatus to them, it is required to bring big imaging systems.

The present invention is made to solve the above problems, and an object thereof is to provide a thin-modeled imaging apparatus with a thin imaging device, and a thin-modeled electronic machine and portable electronic machine capable of mounting thereon an imaging apparatus.

SUMMARY OF THE INVENTION

The first imaging apparatus according to the present invention includes at least an imaging device having a plurality of photoelectric transfer devices arranged in matrix-shape to detect a light irradiated to each photoelectric transfer device and transfer to electric signal, and imaging means for imaging an image of a photogenic object on a surface of the imaging devices, wherein the imaging means images at least two similar images of the photogenic subject on different area of the surface of the imaging device, and the imaging apparatus further includes electric signal processing means to form one image of the photogenic subject from at least two images of the photogenic subject.

In the second imaging apparatus according to the present invention, the imaging means in the first imaging apparatus is composed of a plurality of lens systems having the same shape or refractive index and arranged in a plane parallel to an light-receiving surface of the imaging device.

In the third imaging apparatus according to the present invention, the image formation lenses composing each lens system in the second imaging apparatus are formed integrally.

In the forth imaging apparatus according to the present invention, the image formation lenses composing the lens system in the second imaging apparatus are formed integrally of material having a liner expansion coefficient of not more than $1 \times 10^{-5}/°C$.

In the fifth imaging apparatus according to the present invention, the image formation lenses composing the lens system in the second imaging apparatus are bonded on a substrate having a liner expansion coefficient of not more than $1 \times 10^{-5}/°C$.

BRIEF DESCRIPTION OF THE DRAWINGS

FIG. 2 shows a surface of the imaging device having a size of 640×480 pixels in Embodiment 1 of the present invention;

DETAILED DESCRIPTION

Embodiment 1

Figure 1A:
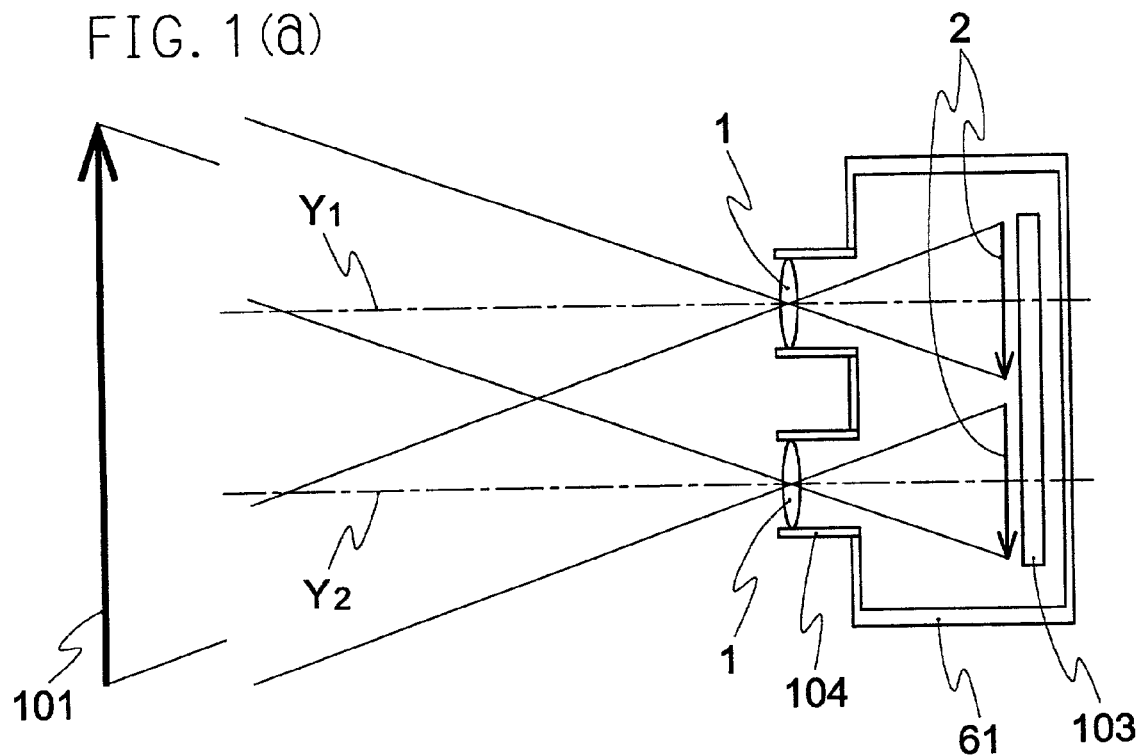
FIG. 1(a) shows a structure of the imaging apparatus according to Embodiment 1 of the present invention and FIG.(b) shows a system of the imaging apparatus.
Figure 1B:
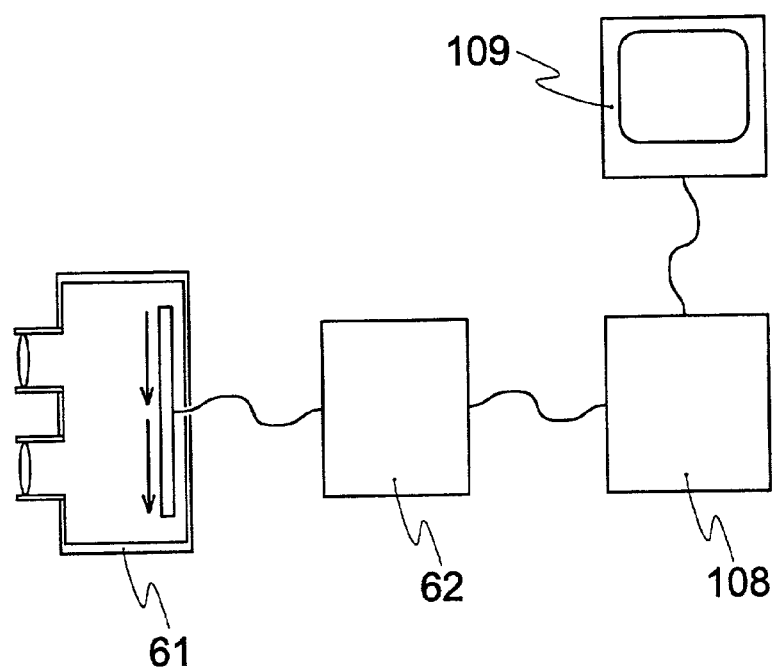

Embodiment 1 of the present invention is explained hereinbelow. FIG. 1(a) shows a structure of the imaging apparatus according to Embodiment 1 of the present invention, and FIG. 1(b) a system of the imaging apparatus. In FIG. 1(a), 1 shows an image formation lens arranged in each lens-barrel 104 to image an image of photogenic subject on a surface of an imaging device, and there are provided in the apparatus two lenses in vertical and horizontal directions respectively, that is 2×2=4 lenses in total. Four image formation lenses individually compose four lens systems. $Y_1$ and $Y_2$ show optical axes of the image formation lenses. 101 shows a photogenic subject, 103 an imaging device having photoelectric transfer devices arranged in a matrix-shape, and 2 four images of the photogenic subject imaged on a light-receiving surface of the single imaging device 103, two of which are seen in the front. 61 shows an imaging apparatus.

The image formation lens 1 is formed of transparent resin such as acrylic resin, polycarbonate and amorphous polyolefin, or inorganic transparent material such as glass, and the shape of lens is deformed by injection molding, heat hardening, optical hardening, press working or etching to give a lens effect.

Next, the operation is explained. A ray of light reflected or generated by the photogenic subject 101 is imaged on the light-receiving surface of the imaging device 103 by each of four image formation lenses. Each of four image formation lenses forms similar image 2 of photogenic subject on the light-receiving surface of the imaging device 103. Many photoelectric transfer devices, e.g. CCD, are arranged on the light-receiving surface of the imaging device 103, and one photoelectric transfer device detects optical intensity of light reaching to a certain space and transfers to electric signal corresponding to optical intensity. If positional information of photoelectric transfer devices and electric signals are given, it is possible to reproduce four images 2 of photogenic subject and resynthesize these images to one image of photogenic subject.

Figure 15:
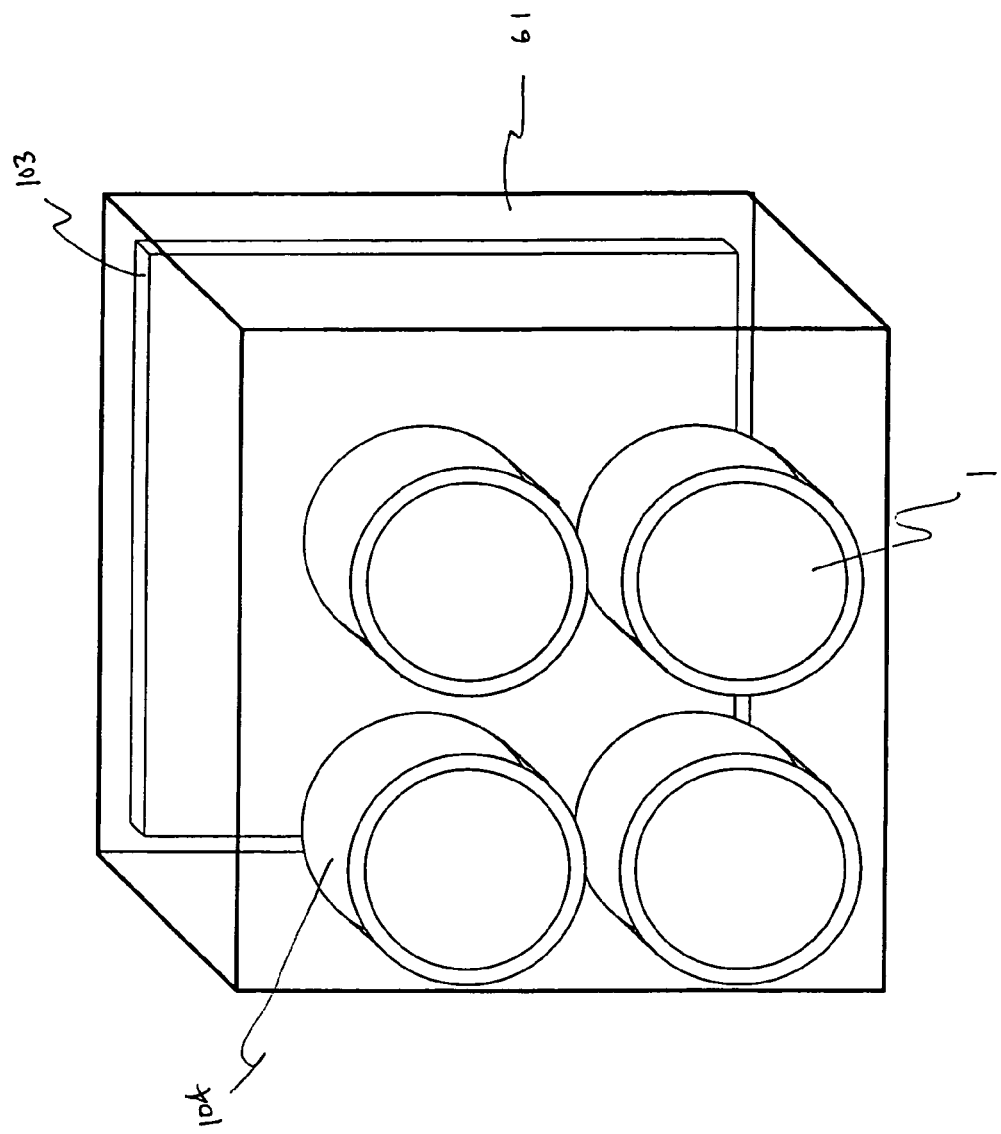
FIG. 15 shows an embodiment of the imaging apparatus from an angled perspective.

In FIG. 1(b), 61 shows an imaging apparatus having an image formation lens shown in FIG. 1(a) for forming four images 2 of photogenic subject on the light-receiving surface of the imaging device 103, and 62 a signal arrangement converter for reproducing one image of photogenic subject from four images 2 of photogenic subject. The signal arrangement converter 62 is composed of, as a well-known circuit, a memory device such as frame memory, a control circuit to read electric signals from imaging devices and a control circuit for reading electric signals from the memory device with controlling the order of reading. FIG. 15 illustrates the imaging apparatus shown in FIG. 1(a) from an angled perspective. The formation of image of photogenic subject in the above arrangement is explained. The electric signal intensity of one photoelectric transfer device, composing the light-receiving surface of the imaging device is read according to arrangement of photoelectric transfer devices (for example, from left of photoelectric transfer devices which are arranged on top in turn, that is, $n_{1,1}, \ldots, n_{x,1}, n_{1,2}, \ldots n_{x,2}, \ldots, \ldots, n_{1,y}, \ldots, n_{x,y}$ shown in FIG. 2). These electric signals of photoelectric transfer devices are written once in the memory device of the signal arrangement converter, and they are read out from the memory device again to be displayed on an image screen 109 through an image data processing device 108. When these electric signals are written in and read out, these electric signals are rearranged corresponding to the number and position of images of photogenic subject, in other words, each pixel is rearranged as $n_{1,1}, n_{(x/2)+1,1}, n_{1,(y/2)+1}, n_{(x/2)+1,(y/2)+1}, n_{2,1}, n_{(x/2)+2,1}, n_{2,(y/2)+1}, n_{(x/2)+2,(y/2)+1}, \ldots n_{x/2,1}, n_{x,1}, n_{x/2,(y/2)+1}, n_{x,(y/2)+1}, n_{1,2}, n_{(x/2)+1,2}, n_{1,(y/2)+2}, n_{(x/2)+1,(y/2)+2}, \ldots n_{x/2,y/2}, n_{x,y/2}, n_{x/2,y}, n_{x,y}$. The electric signals are sent to the image data processing device 108 where one image of photogenic subject is obtained by reading out in this order, so that one image of photogenic subject is displayed on the image display apparatus 109. With this arrangement, the imaging apparatus according to the present invention can synthesize a plurality of images of photogenic subject imaged on the light-receiving surface of the imaging device by a plurality of image formation lenses, to one image of photogenic subject by using a signal arrangement converter.

As described above, the characteristics of optical system for the imaging apparatus are determined by the brightness and the angle of field. The brightness indicated a standard brightness of a photogenic subject which can be photographed when the diaphragm is opened, and ordinarily F number indicated the brightness. Assuming that the imaging device has an opposite angle of b, and the shape thereof is same as that of the ordinary television display having the hight and the width in the ratio of three to four, the angle of field is given by formulas (1) and (2) as described above.

Now, it is assumed to realize an imaging apparatus having F of 2.8 and a horizontal angle of field of 40° by means of a plurality of image formation lenses. The structure shown in FIG. 1 has four (two lenses in the horizontal direction and two lenses in the vertical direction) image formation lenses, and four images of photogenic subject are formed on the light-receiving surface of the imaging device 103. In other words, one image of photogenic subject is formed on each of four light-receiving surfaces obtained by dividing the light-receiving surface equally in the vertical direction and horizontal direction. Therefore, one image of photogenic subject is formed on the light-receiving surface of the imaging device having the opposite angle of b/2. According to the above formulas, there can be obtained L=6.98 mm to get a horizontal angle of 40°, and a=2.49 mm to get F number of 2.8. Therefore, the distance between the image formation lens and the imaging device, that is the thickness of the imaging apparatus becomes approximately 7 mm, which is half of the thickness of a conventional imaging system, thereby a thinner imaging apparatus is realized.

On the other hand, considering the resolution of a photogenic subject like in the case of a conventional imaging device, the width of display for one photogenic subject becomes 5.08 mm, and when the pixel pitch is 15.9 μm, the resolution is 320×240, so that the resolution of the photogenic subject is half of VGA. For example, if there is a photogenic subject having a width of 159 mm in the position of 698 mm away from an image formation lens, one image of photogenic subject formed by the image formation lens will be reduced to 1/100 (6.98÷698) and formed on the light-receiving surface of the imaging device since the distance L between the image formation lens and the imaging device is 6.98 mm. Therefore, the width of image of photogenic subject will be 1.59 mm and the image is read by 100 pixels in the horizontal direction because the image having a width of 1.59 mm is read by the imaging device having a pitch of 15.9 μm. Similarly, other image formation lenses form images of photogenic subject, and each of images of photogenic subject is read by 100 pixels in horizontal direction.

Figure 3:
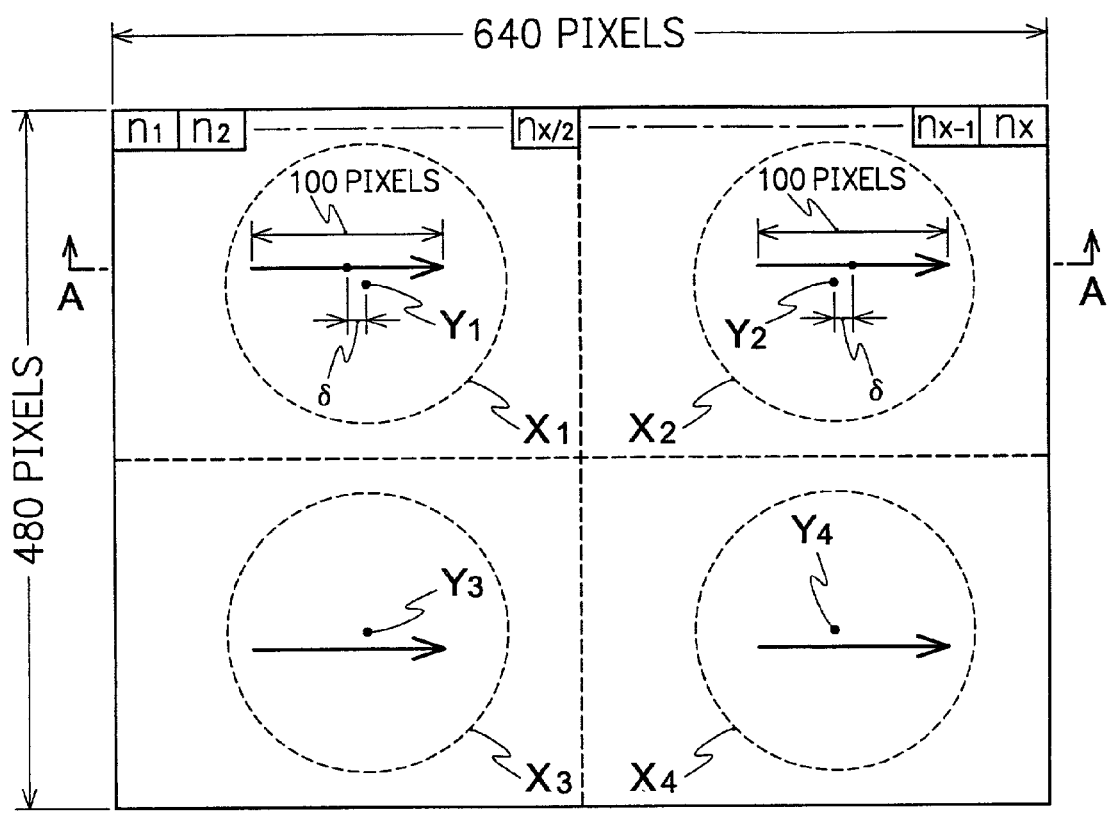
FIG. 3 is an explanatory view showing arrangement of photoelectric transfer devices in Embodiment 1 of the present invention.
Figure 4A:
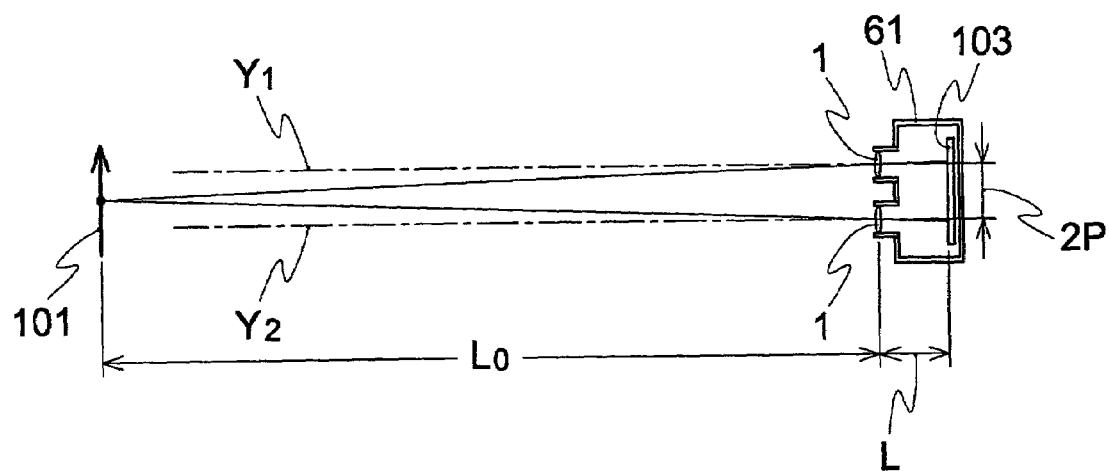
FIG. 4 is an explanatory view showing operation of the imaging apparatus according to Embodiment 1 of the present invention.

FIG. 3 and FIGS. 4(a), (b) show relationship among four image formation lenses, an imaging device and a photogenic subject in Embodiment 1 according to the present invention. FIG. 3 shows a surface of imaging device having 640×480 pixels. $X_1$ to $X_4$ show positions of image formation lenses and $Y_1$ to $Y_4$ show axes of image formation lenses. FIG. 4(a) shows a horizontal sectional view of imaging apparatus taken along the line A—A in FIG. 3. Assuming that the distance of axes of two lenses on the same horizontal surface is 2P, the distance between lenses and the light-receiving surface of the imaging device is L, and the distance between a photogenic subject and lenses is Lo, the center of the image of photogenic subject imaged by two lenses deviates P×(L/Lo) from each axis of image formation lens $Y_1$ and $Y_2$, as is clear from a simple construction. When this deviation is indicated by δ, the distance δH between images of photogenic subject imaged by two image formation lenses is determined by δH=2δ+2P, in other words $$\delta H = 2P \times (1 + (L/Lo)) \qquad (3)$$

When δH equals integral multiples of the pitch of imaging device, two images of photogenic subject are completely the same from each other. In other cases, imaging devices in two areas can sample different parts of images of photogenic subject, and synthesizing these images by electric signals equals to reading of images of photogenic subject by horizontal 200 pixels. Thus, it is possible to obtain resolution equal to that of the conventional cameras with thin-modeled cameras having short focal distance.

Embodiment 2

Figure 5:
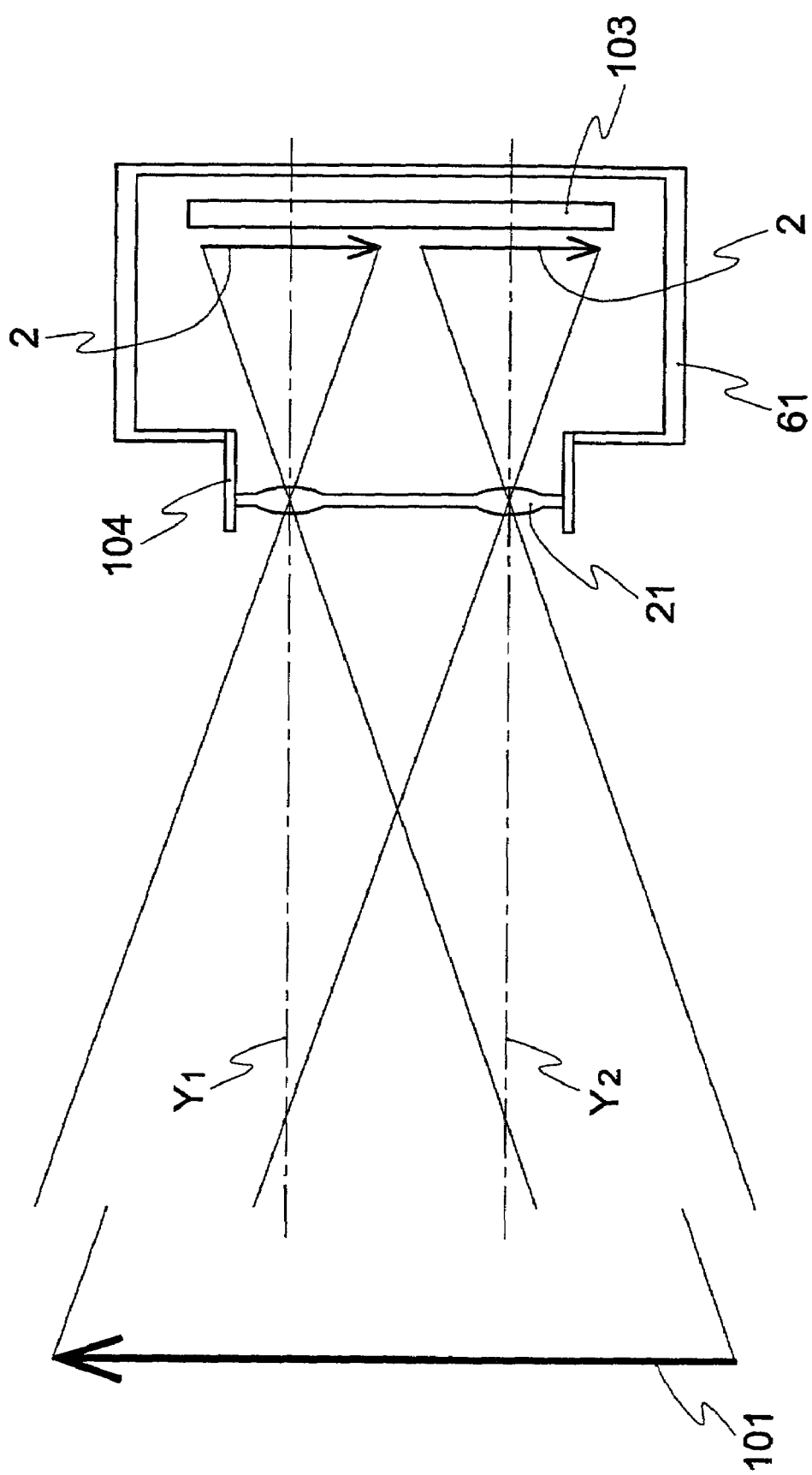
FIG. 5 shows a structure of the imaging apparatus according to Embodiment 2 of the present invention.

FIG. 5 shows a structure of the image system according to Embodiment 2 of the present invention, and the following embodiments show modified embodiments based on the structure shown in FIG. 1. In FIG. 5, 21 shows a unified image formation lens built in a lens-barrel 104, and four (2 lenses in the horizontal direction and 2 lenses in the vertical direction) image formation lenses are built in the lens-barrel 104. Four image formation lenses 21 individually compose four lens systems. The unified four image formation lenses 21 are formed of transparent resin such as acrylic resin, polycarbonate and amorphous polyolefin, and the surface shape of lenses can be deformed easily by injection molding, heat hardening, optical hardening, press working or etching to give a lens effect.

Also, it is possible to give a lens effect to a unified four image formation lenses 21 by preparing a substrate formed of transparent resin such as acrylic resin, polycarbonate and amorphous polyolefin and by changing partly its refractive index through ion implant process or ion exchange process.

Next, the operation is explained. A ray of light reflected or generated by the photogenic subject 101 is imaged on the light-receiving surface of single imaging device 103 by four image formation lenses 21 unified on the transparent resin. Each of four unified image formation lenses 21 images an image of the photogenic subject 2 on the light-receiving surface of the imaging device 103, and these are resynthesized to get a thinner imaging apparatus compared to the conventional imaging apparatus having the same brightness, angle of field and resolution as those of the present embodiment.

In addition, in this embodiment, it does not need to respectively install an image formation lens 1 in individual lens-barrels shown in FIG. 1, but it is sufficient to install only the unified four image formation lenses 21 in front of the light-receiving surface of the imaging device 103, thereby simple structure and lightening is realized. Also, by only adjusting the distance between unified four image formation lenses 21 and the light-receiving surface of the imaging device 103, necessary focussing for each image formation lens is simply accomplished, so that the adjustment time can be shortened.

Embodiment 3

Figure 6:
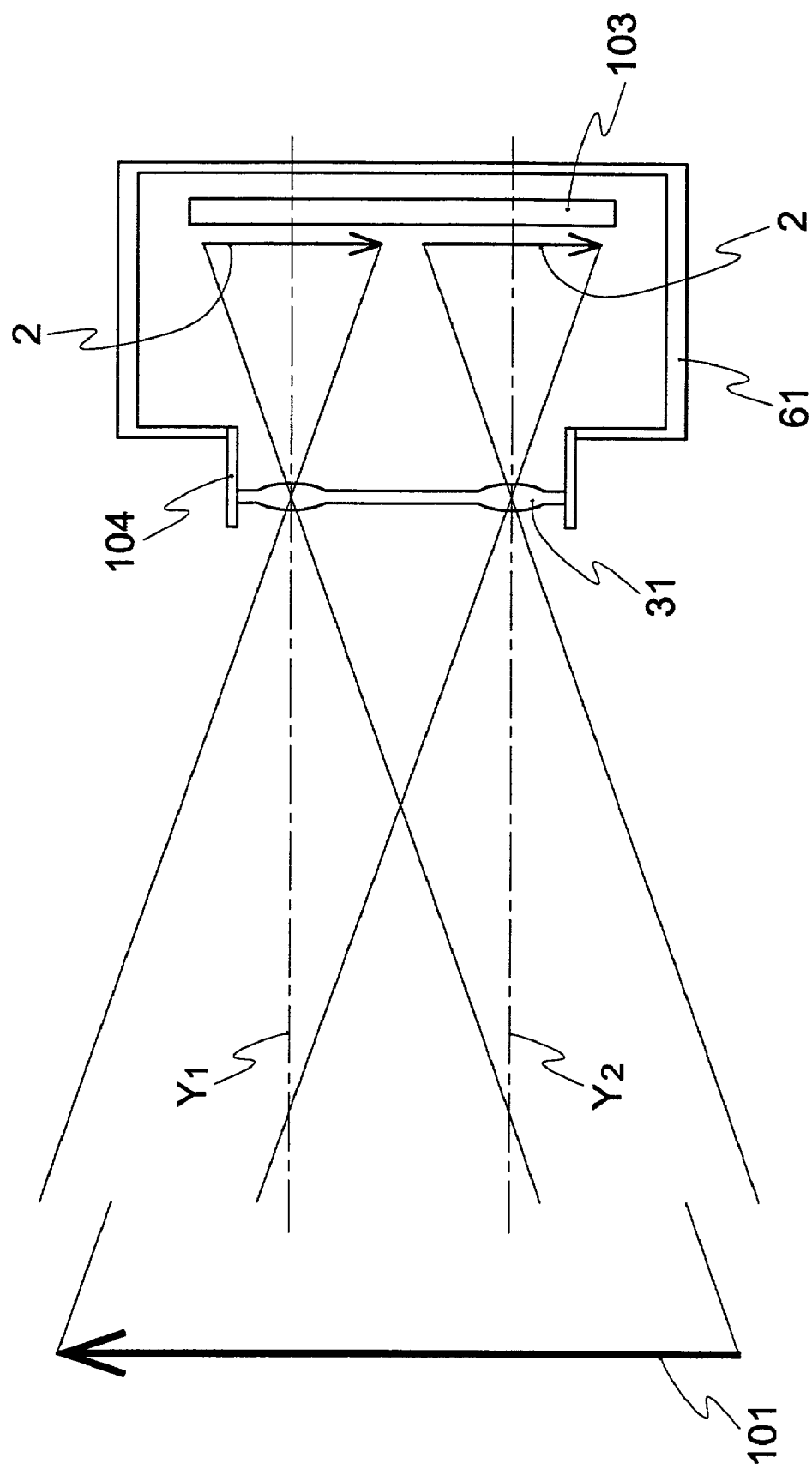
FIG. 6 shows a structure of the imaging apparatus according to Embodiment 3 of the present invention.

FIG. 6 shows a structure of the imaging apparatus according to Embodiment 3 of the present invention. In FIG. 6, 31 shows unified four (2 lenses in the horizontal direction and 2 lenses in the vertical direction) image formation lenses formed of material having a linear expansion coefficient of not more than about $1 \times 10^{-5}$/° C. and built in the lens-barrel, and each of them composes a lens system. The unified four lenses 31 are formed of transparent inorganic material such as glass, and the shape of lenses can be deformed by press working or etching to give a lens effect.

Also, it is possible give a lens effect to unified four image formation lenses 31 by preparing a transparent inorganic material such as glass and by changing partly its refractive index through ion implant process or ion exchange process.

Next, the operation is explained. A ray of light reflected or generated by the photogenic subject 101 is imaged on the light-receiving surface of the imaging device 103 by unified four image formation lenses 31. Each of four unified image formation lenses 21 images an image of the photogenic subject 2 on the light-receiving surface of the imaging device 103, and these are resynthesized to get a thinner imaging apparatus compared to the conventional imaging apparatus having the same brightness, angle of field and resolution as those of the present embodiment.

Further, it does not need to respectively install an image formation lens 1 in individual lens-barrels shown in FIG. 1, but it is sufficient to install only the unified four image formation lenses 21 in front of the light-receiving surface of the imaging device 103, thereby simple structure and lightening is realized. Also, by only adjusting the distance between the unified four image formation lenses 21 and the light-receiving surface of the imaging device 103, necessary focussing for each image formation lens is simply accomplished, so that the adjustment time can be shortened.

Figure 4B:
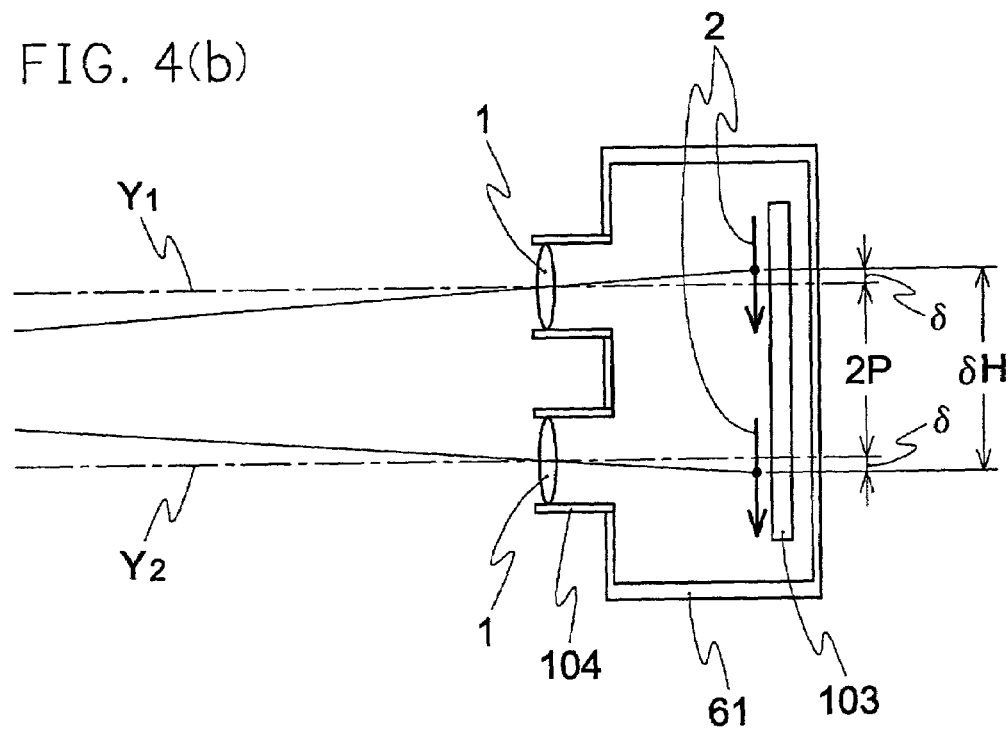

Thinking about use conditions of the imaging apparatus, it is required to be stable against change in the environment, particularly change in environmental temperature. For example, it is preferable that the imaging apparatus is stable to a change of 50° C. within a general operating temperature guarantee range of −5 to 45° C. As shown in FIG. 4(b), in the imaging apparatus according to the present invention, imaging devices in two areas can sample different parts of images of photogenic subject when the deviation δ between the center of image of photogenic subject and the axis of lens is not integral multiples of the pitch of imaging device, and synthesizing these images equals to reading of images of photogenic subject by horizontal 200 pixels. A factor δH influencing on resolution is determined by formula (3). According to formula (3), δH is influenced hardly by the distance L between the image formation lens and the light-receiving surface of the imaging device, but is proportional to the pitches 2P of four image formation lenses. When pitches deviate by the change of temperature environment, resolution changes if the same photogenic subject is positioned at a position away from the image formation lens by the same distance.

According to the present embodiment, since the unified four image formation lenses are formed of transparent inorganic material such as glass, the linear expansion coefficient thereof is not more than about $1\times10^{-5}/°$ C. and the amount of change in δH by temperature can be restrained in micro-order, thereby an image of a predetermined resolution can be obtained not depending on changes in environmental temperature.

Embodiment 4

Figure 7:
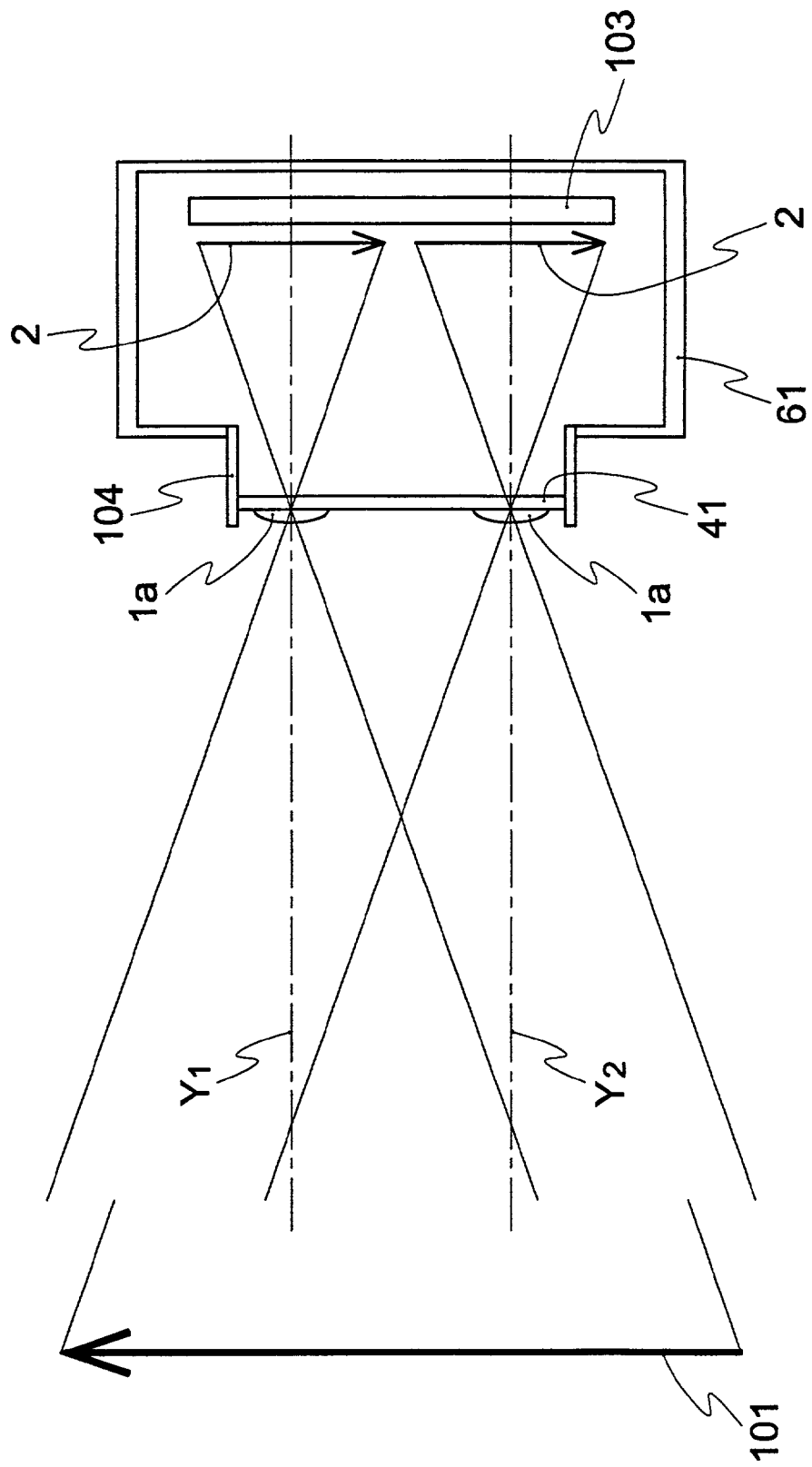
FIG. 7 shows a structure of the imaging apparatus according to Embodiment 4 of the present invention.

FIG. 7 shows a structure of the imaging apparatus according to Embodiment 4 of the present invention. In FIG. 7, 41 shows a substrate having a linear expansion coefficient of not more than $1\times10^{-5}/°$ C., and four (2 lenses in the horizontal direction and 2 lenses in the vertical direction) image formation lenses 1a are arranged on the substrate 41.

Each of image formation lenses 1a composes separately a lens system, and is formed of transparent resin such as acrylic resin, polycarbonate and amorphous polyolefin, or transparent inorganic material such as glass. The image formation lenses is deformed by injection molding, heat hardening, optical hardening, press working or etching to give a lens effect.

Also, it is possible to give a lens effect to image formation lenses 1a by preparing a transparent resin such as acrylic resin, polycarbonate and amorphous polyolefin, or transparent inorganic material such as glass and by changing partly its refractive index through ion implant process or ion exchange process.

Figure 8:
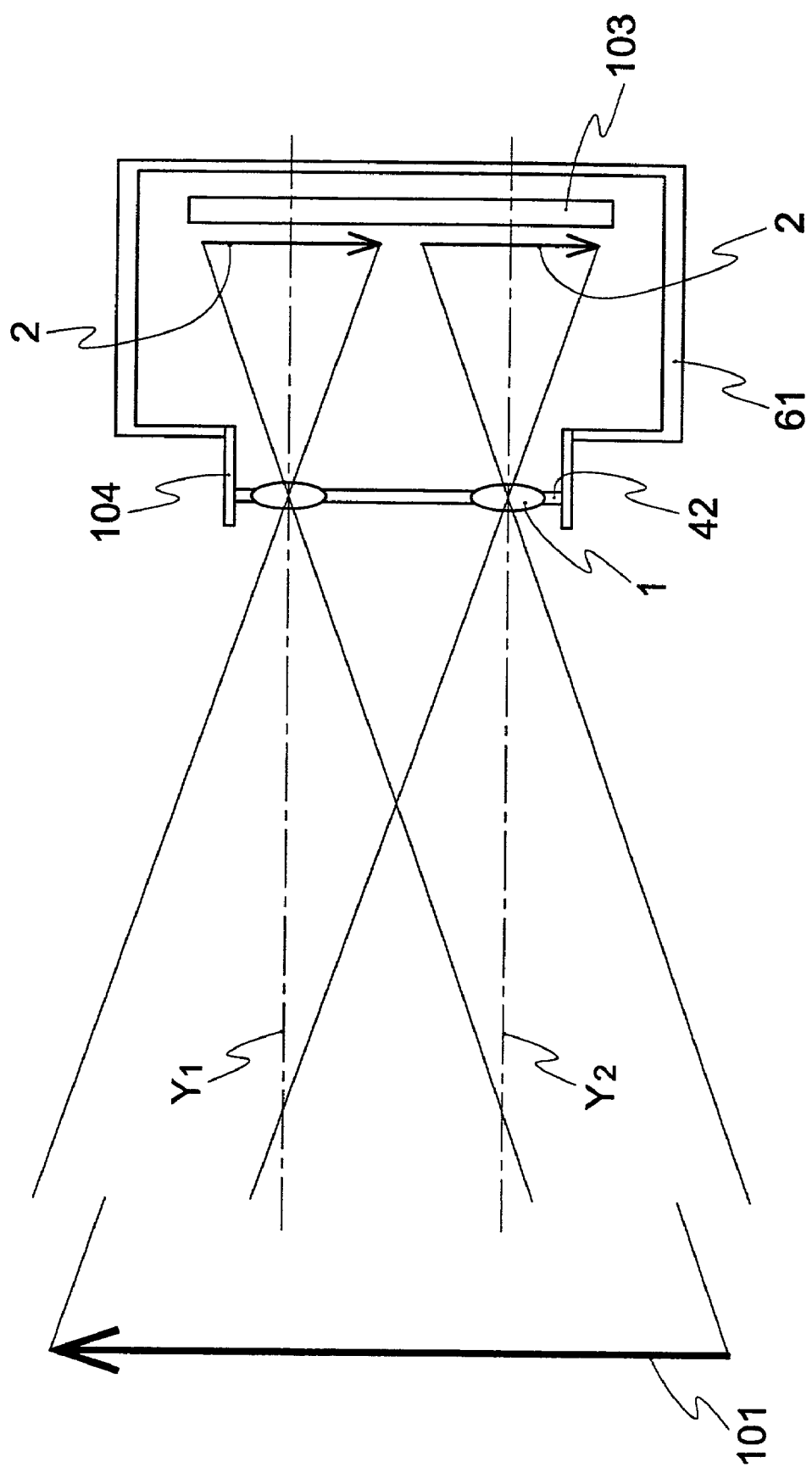
FIG. 8 shows a structure of the imaging apparatus according to Embodiment 4 of the present invention.

One the other hand, the substrate 41 is formed of transparent inorganic material such as glass on which the image formation lenses 1a are bonded and formed by thermal compression bonding, adhesion or bicolor forming. Also, as shown in FIG. 8, four holes might be formed in a substrate having a linear explanation coefficient of not more than $1\times10^{-5}/°$ C. for attachment of the image formation lenses 1a, and the image formation lenses 1a might be attached thereto.

Next, the operation is explained. A ray of light reflected or generated by the photogenic subject 101 is imaged on the light-receiving surface of single imaging device 103 by a plurality of image formation lenses 1a formed on the substrate 41. The imaging apparatus with the above arrangement can realize a thinner imaging apparatus than the conventional one having the same brightness, angle of field and resolution as those of the present embodiment. Also, it is sufficient to install only one substrate 41 to which four image formation lenses 1a are bonded or one substrate 42 to which four image formation lenses 1 are attached, thereby simple structure and lightening is realized. Further, the adjustment time for focusing can be advantageously shortened.

In addition, in this embodiment, since the substrate 41 to which four image formation lenses 1a with high accuracy are bonded or substrate 42 to which four image formation lenses 1 are attached is formed of transparent inorganic material such as glass having a linear expansion coefficient of not more than $1\times10^{-5}/°$ C.m, the amount of change in δH by temperature between the center of image of photogenic subject and the axis of lens shown in FIG. 4(b can be restrained in micro-order, thereby image of a predetermined resolution can be obtained stably not depending on ambient temperature which might changes by 50° C. from −5° C. to 45° C. which is an operating temperature guarantee range of the imaging apparatus.

Embodiment 5

Figure 9:
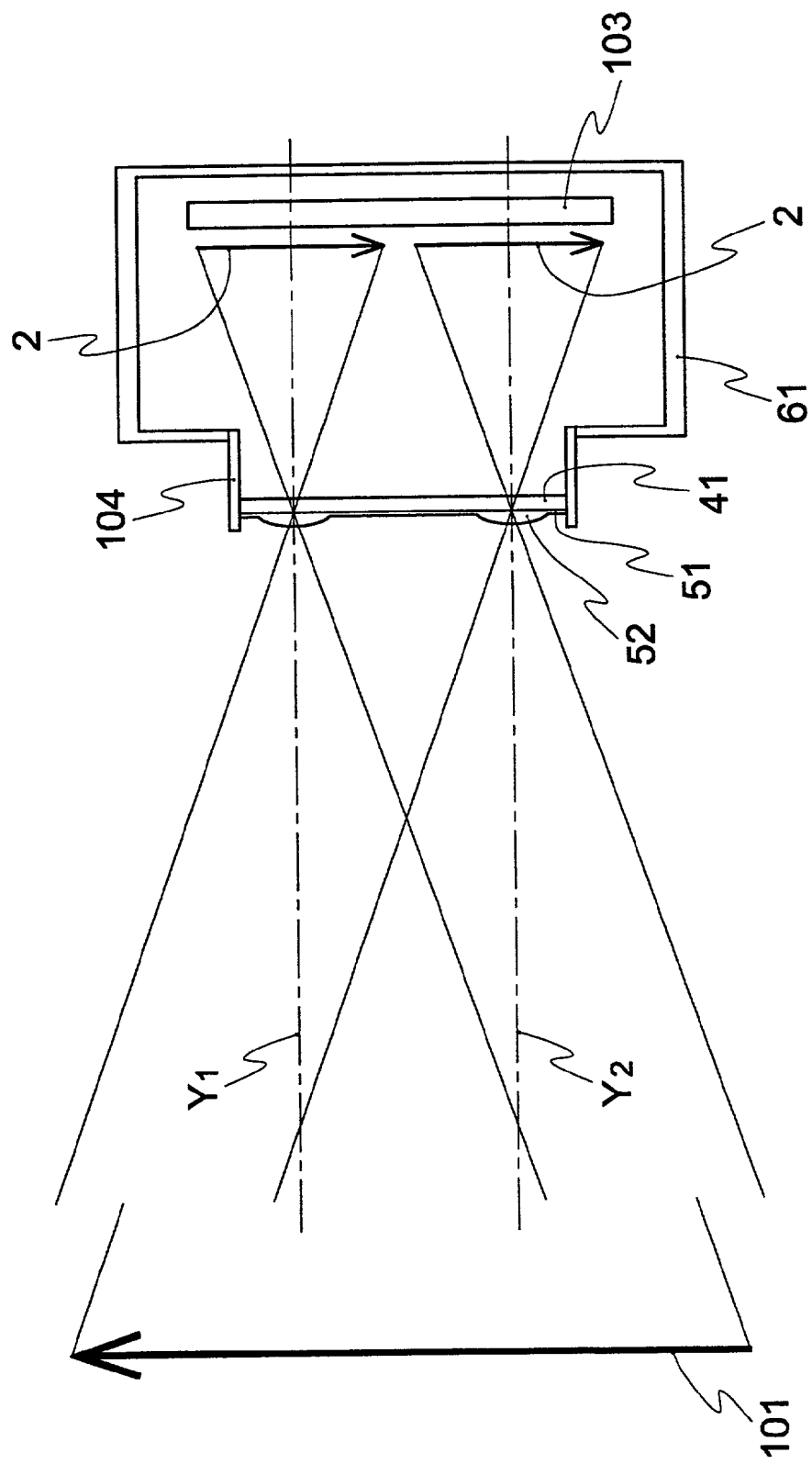
FIG. 9 shows a structure of the imaging apparatus according to Embodiment 5 of the present invention.

FIG. 9 shows a structure of the imaging apparatus according o Embodiment 5 of the present invention. In FIG. 9, 51 shows a sheet having four (2 lenses in the horizontal direction and 2 lenses in the vertical direction) unified image formation lenses 52 formed of transparent resin such as acrylic resin, polycarbonate and amorphous polyolefin. The surface shape of lenses is deformed by injection molding, heat hardening, optical hardening or etching. 41 shows a substrate having a stronger rigidity than the sheet and a linear expansion coefficient of not more than $1\times10^{-5}/°$ C. The sheet 51 having a plurality of image formation lenses 52 are bonded to the substrate 41 having a linear expansion coefficient of not more than $1\times10^{-5}/°$ C., and they are built in the lens-barrel 104.

Figure 10:
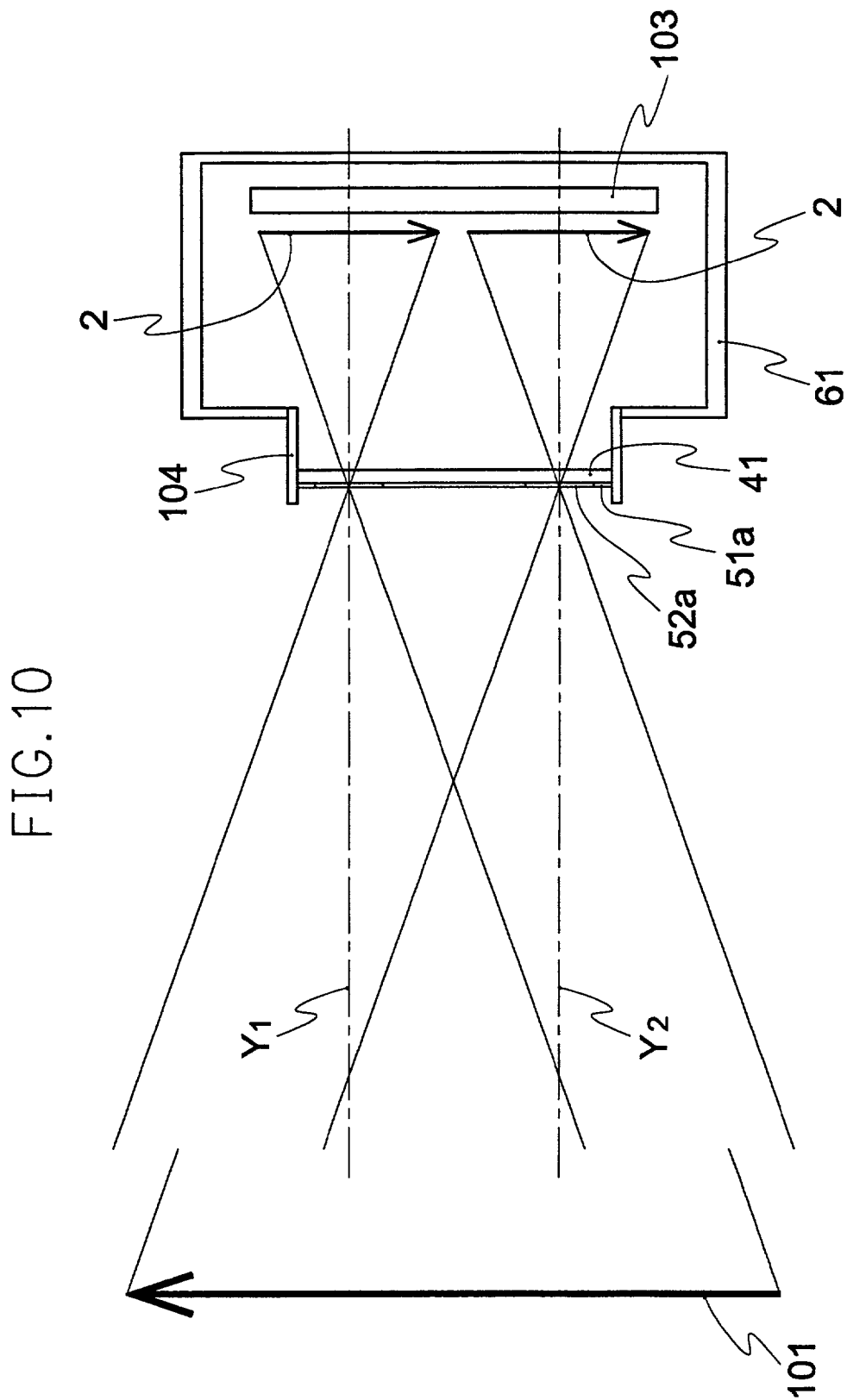
FIG. 10 shows a structure of the imaging apparatus according to Embodiment 5 of the present invention.

Also, as shown in FIG. 10, there can be obtained the same effect as stated above by forming the sheet 51a with four (2 lenses in the horizontal direction and 2 lenses in the vertical direction) image formation lenses 52a of transparent resin such as acrylic resin, polycarbonate resin and amorphous polyolefin, or transparent inorganic material such as glass, by partly changing the refractive index of the material by ion implant process or ion exchange process to give a lens effect, and by bonding the sheet 51a to the substrate 41 having a larger rigidity than the sheet and a linear expansion coefficient of not more than $1 \times 10^{-5}/°$ C.

Next, the operation is explained. A ray of light reflected or generated by the photogenic subject 101 is imaged on the light-receiving surface of single imaging device 103 by the image formation lenses 52, 52a formed on the substrate 41. The imaging apparatus can realize a thinner imaging apparatus than the conventional one having the same brightness, angle of field and resolution as those of the present embodiment.

In the present embodiment, each of four image formation lenses composes a lens system and these image formation lenses can be unified, so that it is easy to form pitches between lenses precisely.

Moreover, like in the case of the above embodiments, the imaging apparatus can realize a thinner imaging apparatus than the conventional one having the same brightness, angle of field and resolution as those of the present embodiment. Also, it is sufficient to install only one substrate 41 to which four image formation lenses 1a are bonded, thereby simple structure and lightening is realized. Further, the adjustment time for focussing can be advantageously shortened.

In addition, in Embodiment 5 according to the present invention, since the sheet 51, 51a with four unified image formation lenses 52, 52a is bonded to the substrate 41 having a linear expansion coefficient of not more than about $1 \times 10^{-5}/°$ C. to give rigidity to the substrate 41, the lens pitch does not change to environmental temperature which might change by 50° C. from −5° C. to 45° C. which is an operating temperature guarantee range of the imaging apparatus, thereby image of a predetermined resolution can be obtained stably.

In the above embodiments, though the explanation is made based on the case in which four lenses are employed, the number of lenses is not limited to four in the present invention and the other number of lenses can be also employed.

Embodiment 6

Figure 11:
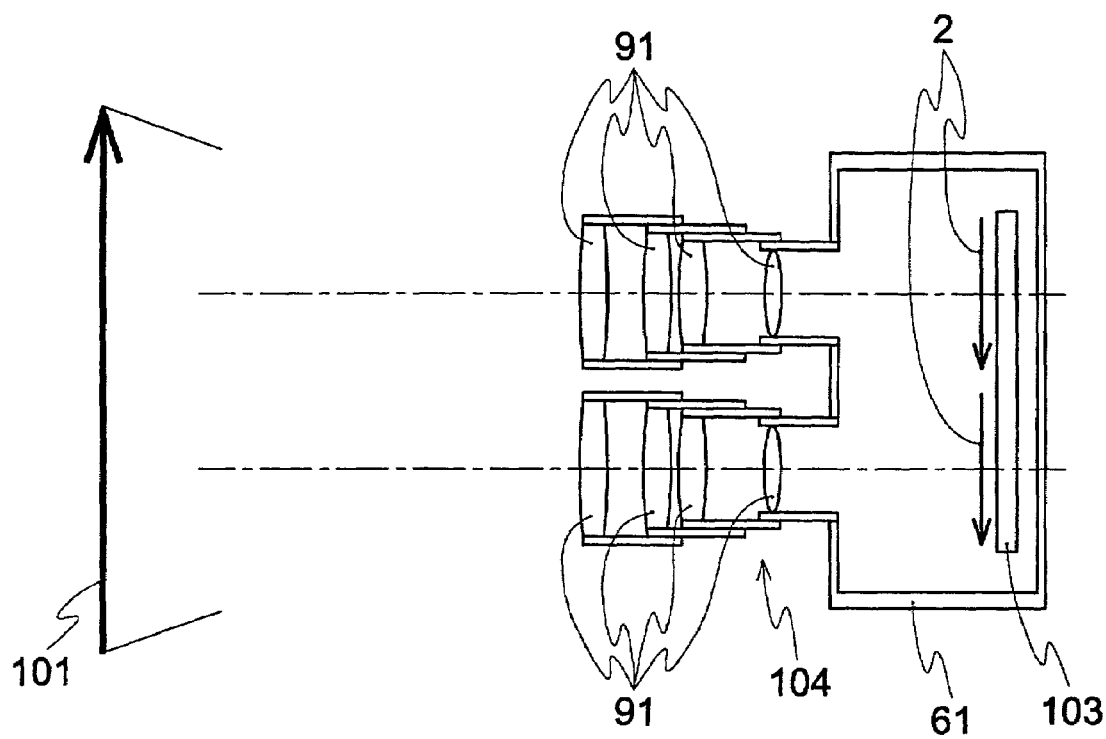
FIG. 11 shows a structure of the imaging apparatus according to Embodiment 6 of the present invention.

Lens systems according to the above embodiments consist of single image formation lens, but each of the lens systems according to this embodiment consists of four image formation lenses (lens assembly). FIG. 11 shows a structure of the imaging apparatus according to Embodiment 6, and corresponds to Embodiment 1 shown in FIG. 1. In FIG. 11, 91 shows a lens assembly composed of four image formation lenses installed in each lens-barrel 104 to image the image of photogenic subject on the light-receiving surface of single imaging device, and the image apparatus includes four (2 systems in the horizontal direction and 2 systems in the vertical direction) lens systems.

Next, the operation is explained. A ray of light reflected or generated by the photogenic subject 101 is imaged on the light-receiving surface of the imaging device 103 by four image formation lenses 21 (lens assembly). Each assembly) forms similar image 2 of photogenic subject on the light-receiving surface of the imaging device 103. Many fine photo-detectors such as CCD are arranged on the light-receiving surface of the imaging device 103, and one photo-detector detects the optical intensity of light reaching to a certain space and transfers to electric signal corresponding to optical intensity.

If the positional information of photo-detectors and electric signals are given, it is possible to reproduce four images 2 of photogenic subject which is imaged on whole of single imaging device and resynthesize them to one image of photogenic subject as described in the above embodiments. With this arrangement, there can be realized a thinner imaging apparatus than compared to the conventional imaging apparatus having the same brightness, angle of field and resolution as those of the embodiment.

Embodiment 7

Figure 12:
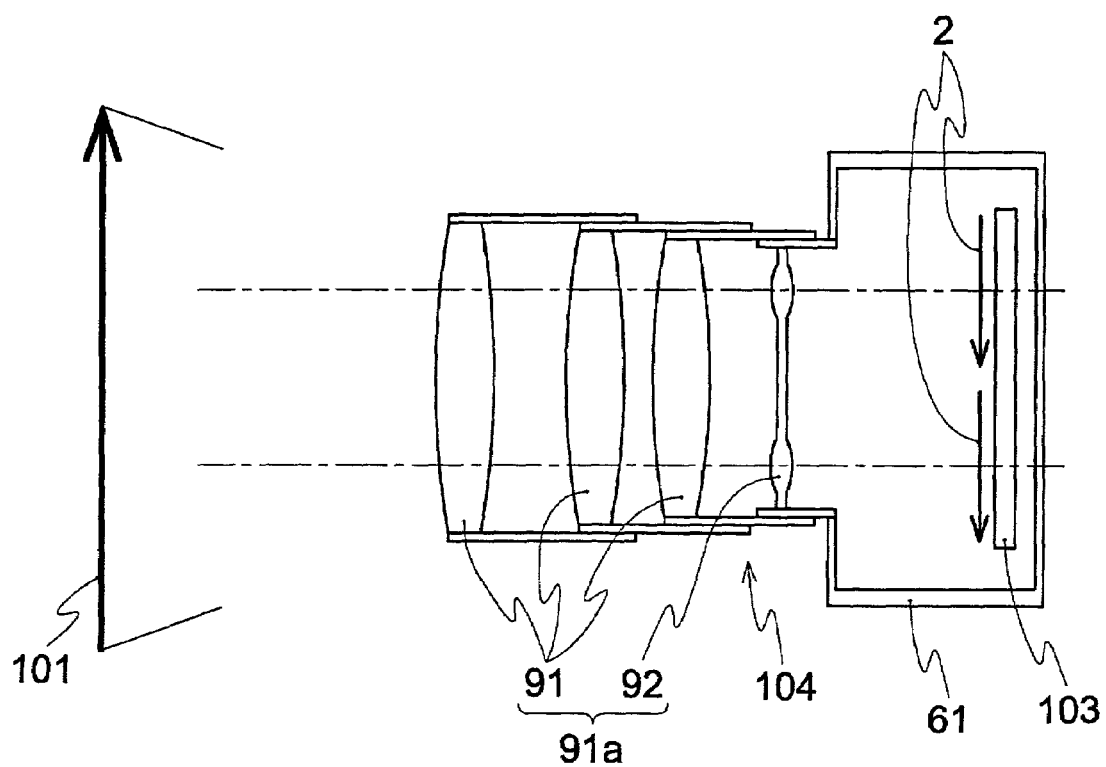
FIG. 12 shows a structure of the imaging apparatus according to Embodiment 7 of the present invention.

FIG. 12 shows a structure of imaging apparatus according to Embodiment 7, and corresponds to embodiments in FIG. 5 and FIG. 6. In FIG. 12, 91a shows four image formation lenses (lens assembly) installed in lens-barrel 104 and composes a lens system. The lens assembly 91a comprises three image formation lenses 91 arrange in the direction of optical axis, and four (2 lenses in the horizontal direction and 2 lenses in the vertical direction) unified image formation lenses 92. Unified image formation lenses 92 are formed of transparent resins such as acrylic resin, polycarbonate and amorphous polyolefin, and the shape of lens can be deformed easily by injection molding, heat hardening, optical hardening, or etching to give a lens effect.

Also, it is possible to give a lens effect to a unified four image formation lenses 92 by preparing a substrate formed of transparent resin such as acrylic resin, polycarbonate and amorphous polyolefin and by changing partly its refractive index through ion implant process or ion exchange process.

Next, the operation is explained. A ray of light reflected or generated by the photogenic subject 101 passes through the lens assembly having a zoom function end is imaged on the light-receiving surface of single imaging device 103 by four image formation lenses 92 unified on the transparent resin. Each of four unified image formation lenses 92 forms similar image 2 of photogenic subject on the light-receiving surface of the imaging device 103, which images can be resynthesized using the same method as explained in the above embodiments.

According to this structure, image formation lenses 92 in the lens assembly 91a is unified to compose four lenses, so that it is possible to realize the imaging apparatus which has a lens assembly of simple structure and which is light and easy to adjust.

Also, if the image formation lens 92 is formed of transparent inorganic material such as glass, the linear expansion coefficient thereof is not more than about $1 \times 10^{-5}/°$ C. Thus, there can be obtained an image having a pre-determined resolution not depending on changes in environmental temperature, since the amount of change in δH by temperature can be restrained in micro-order.

Embodiment 8

Figure 13:
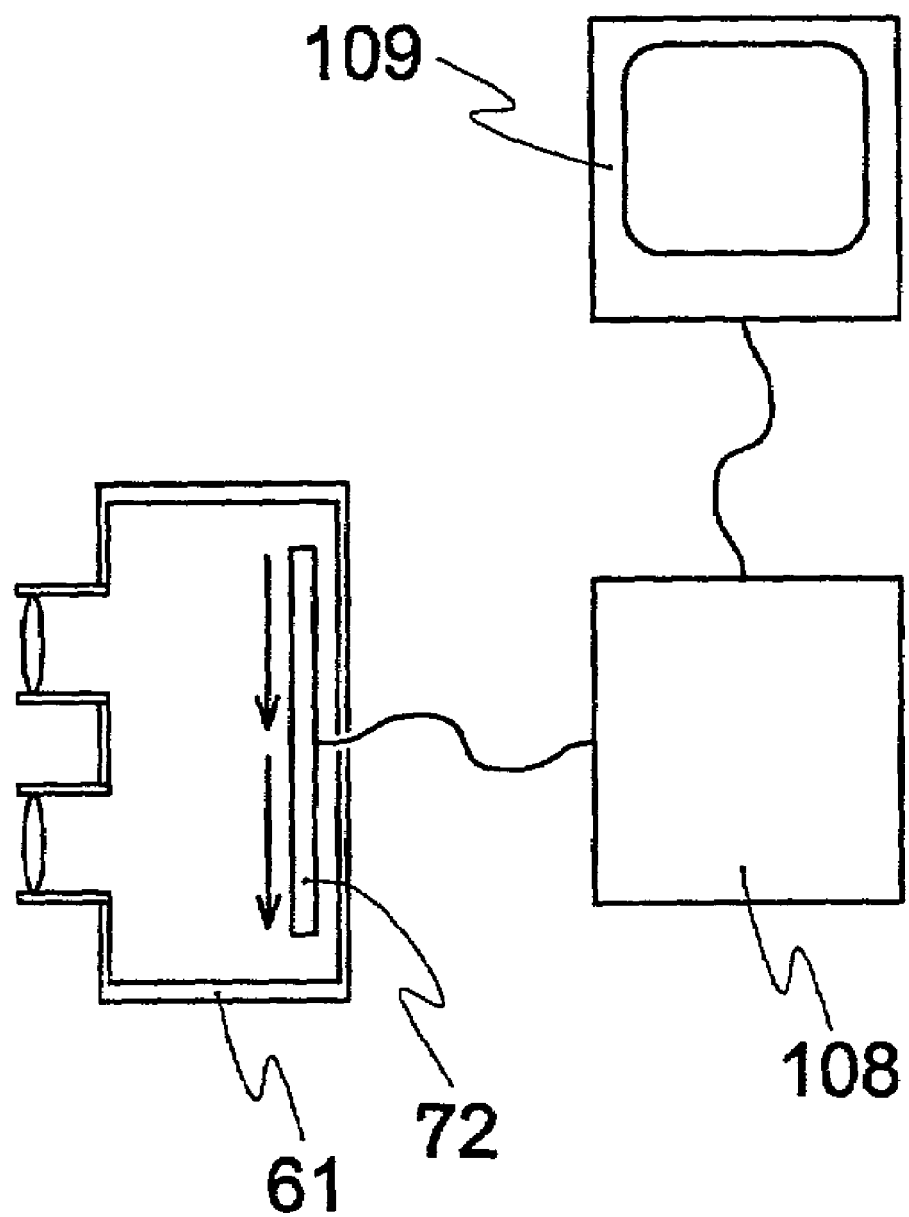
FIG. 13 shows a structure of the imaging apparatus according to Embodiment 8 of the present invention.
Figure 14:
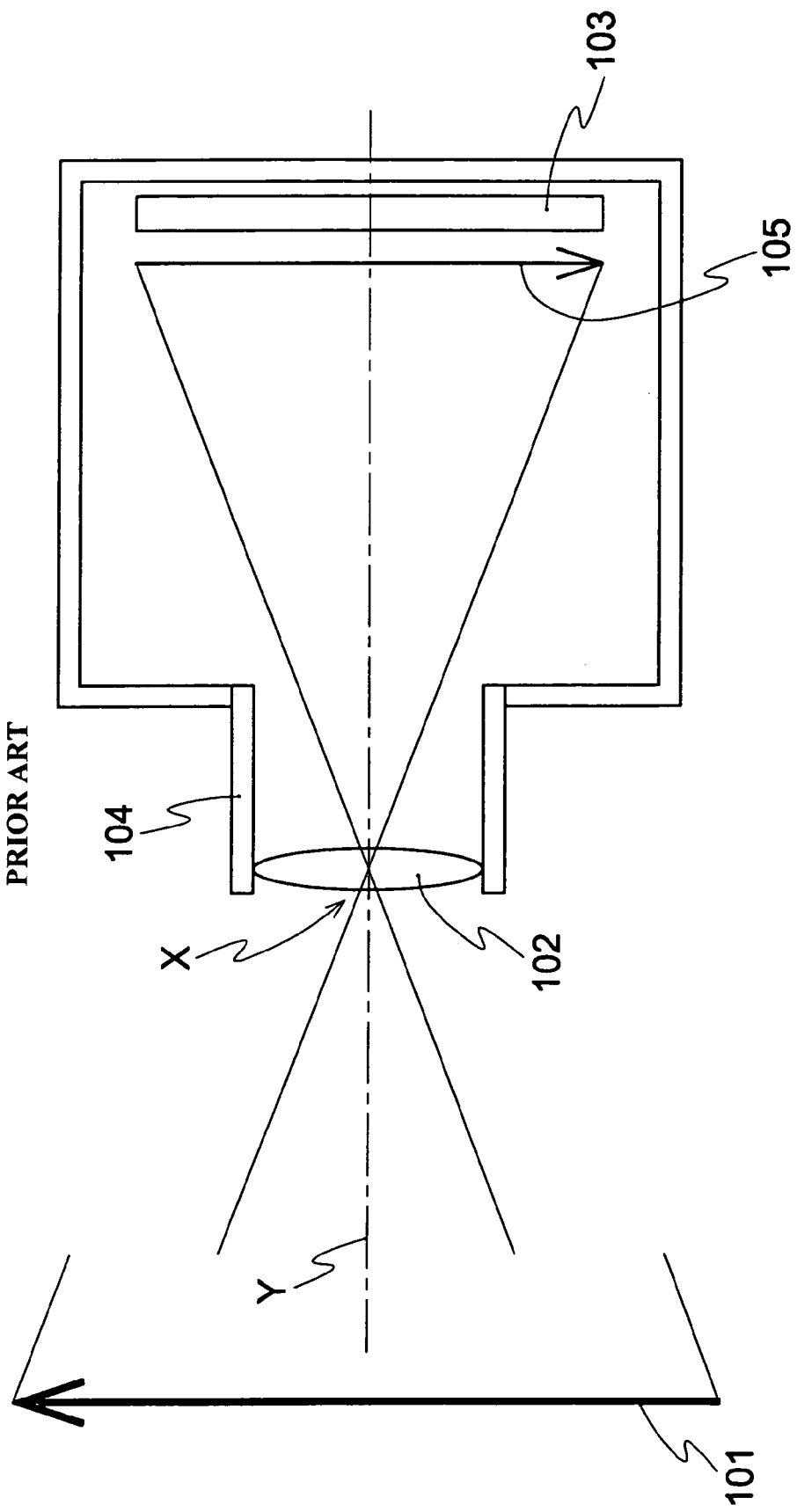
FIG. 14 shows resolution of a conventional imaging apparatus.

FIG. 13 shows a system of the imaging apparatus according to Embodiment 8 of the present invention, more particularly, this shows an imaging apparatus which employs, as the imaging device shown in FIG. 1(a), an imaging device having processing means for a plurality of photoelectric transfer devices in the imaging device. In FIG. 13, 61 shows an imaging apparatus which comprises an imaging device having processing means for a plurality of photoelectric transfer devices in the imaging device, and 72 an imaging device having processing means for a plurality of photoelectric transfer devices in the imaging device. The imaging apparatus which employs the imaging device 72 having processing means for a plurality of photoelectric transfer devices in the imaging device has a function of the signal arrangement converter 62 shown in FIG. 1(a), so that electric signal intensity of the photoelectric transfer devices can be converted to form one image of photogenic object by the processing means for a plurality of photoelectric transfer devices regardless of position of photoelectric transfer devices and can be directly sent to an image processing device 108, thereby one image of photogenic object can be projected by the image display apparatus 109.

According to the imaging apparatus which employs, as an imaging device, the imaging device having processing means for a plurality of photoelectric transfer devices in the imaging device, it is possible to change signal arrangement in the imaging device if a plurality of image formation lenses form a plurality of images of photogenic subject on the imaging device, so that it is not required to provide a special signal arrangement converter in the imaging system, thereby realizing an imaging apparatus with a simple structure at a low cost.

Also, it is not required to provide an amplifier to amplify electric signals in the image processing device 108 if employing the imaging device having an amplifier in each photoelectric transfer device in the imaging device, thereby realizing an imaging apparatus with a simple structure at a low cost.

Next, there is explained a case where the imaging apparatus shown in any of Embodiments 1 to 6 is mounted on electronic devices.

A laptop type PC carrying the imaging apparatus will be described. The imaging apparatus has a well known analog-digital interface circuit as an image display device. The imaging apparatus is installed at a center of upper part of image display device of the laptop type PC, but this can be installed at any position of a periphery of the image display device.

In that case, the display device can be made thin because of a thin imaging apparatus as stated above, or it is not necessary to partly thicken the display device for installation of the imaging apparatus, so that laptop type PC can be made thinner. Also, if employing a detachable arrangement, a thin laptop type PC can be obtained without sacrificing the overall thinness thereof. Moreover, since the imaging apparatus is equipped with signal processing means for forming one image of photogenic subject from a plurality of images of photogenic subject, normal images can be displayed by only providing the laptop type PC with the same image processing circuit as that of the conventional imaging system.

Next, there is explained a case where the imaging apparatus in mounted on an upper part of a mobile phone. In that case, the position of the imaging apparatus is not limited.

As stated above, the mobile phone can be made thin because of a thin imaging apparatus, or it is not necessary to partly thicken the mobile phone for installation of the imaging apparatus, so that the mobile phone can be made thinner. Also, if employing a detachable arrangement, a thin mobile phone can be obtained without sacrificing the overall thinness thereof. Moreover, since the imaging apparatus is equipped with signal processing means for forming one image of photogenic subject from a plurality of images of photogenic subject, normal images can be displayed by only providing the mobile phone with the same image processing circuit as that of the conventional imaging apparatus.

A portable camera carrying the imaging apparatus will be described. In also that case, the portable camera can be made thin because of a thin imaging apparatus as stated above, or it is not necessary to partly thicken the portable camera for installation of the imaging apparatus, so that the whole of the portable camera can be made thinner, thereby realizing a card-shaped portable camera. Also, since the imaging apparatus is equipped with signal processing means for forming one image of photogenic subject from four images of photogenic subject, normal images can be displayed by only providing the portable camera with the same image processing circuit as that of conventional prior imaging system.

A portable information terminal carrying the imaging apparatus will be described. In also this case, the position of the imaging apparatus is not limited.

As described above, the portable information terminal can be made thin because of a thin imaging apparatus, or it is not necessary to partly thicken the portable information terminal for installation of the imaging apparatus, so that the portable information terminal can be made thinner, thereby the portable information terminal can be stored easily in a breast pocket. Also, since the imaging apparatus is equipped with signal processing means for forming one image of photogenic subject from a plural of images of photogenic subject, normal images can be displayed by only providing the portable information terminal with the same image processing circuit as that of the conventional imaging system.

A wrist watch carrying the imaging apparatus will be described. In also this case, the position of the imaging apparatus is not limited.

As stated above, the wrist watch can be made thin because of a thin imaging apparatus, or it is not necessary to partly thicken the wrist watch for installation of the imaging apparatus, so that the wrist watch can be made thinner, which give a good feeling for fitting. Also, since the imaging apparatus is equipped with signal processing means for forming one image of photogenic subject from a plurality of images of photogenic subject, normal images can be displayed by only providing the wrist watch with the same image processing circuit as that of the conventional imaging system.

According to the first aspect of the present invention, since a plurality of images of photogenic subject can be formed on the imaging device by a plurality of image formation lenses, a thinner imaging apparatus can be realized.

Moreover, according to the second aspect of the present invention, since the image formation lenses in the first aspect are composed of a plurality of lens systems having the same shape or the same distribution of refractive index, and are arranged in a plane parallel with the light-receiving surface of the imaging device, a thinner imaging apparatus can be realized.

Also, according to the third aspect of the present invention, since the image formation lenses composing the lens system are unified, there can be realized an imaging apparatus of a simple structure which is light and easy to adjust.

Also, according to the fourth aspect of the present invention, since the image formation lenses composing the lens system are unified with using material having a linear expansion coefficient of not more than $1\times10^{-5}/°$ C., there can be obtained an imaging apparatus of a simple structure which is light, easy to adjust and does not change its resolution to the change in environmental temperature.

Also, according to the fifth aspect of the present invention, since the image formation lens composing the lens system are formed on a substrate having a linear expansion coefficient of not more than $1\times10^{-5}/°$ C., there can be obtained an imaging apparatus of a simple structure which is light, easy to adjust and does not change its resolution to the change in environmental temperature.

What is claimed is:

1. An imaging apparatus comprising:
    a plurality of photoelectric transfer devices arranged in matrix-shape to detect a light irradiated to each photoelectric transfer device and transfer the light into an electric signal;
    a lens apparatus configured to direct an image of a subject onto a surface of the imaging device, the lens apparatus directing at least three images of the subject onto at least three different areas of the surface of the imaging device said at least three different areas being non-overlapping; and
    an electric signal processor configured to interleave the at least three images of the subject to form an integrated image of the subject.

2. The imaging apparatus of claim 1, wherein the electric signal processor is configured to interleave pixels of corresponding position of the at least three images of the subject.

* * * * *